US008295253B2

(12) United States Patent
Chen et al.

(10) Patent No.: US 8,295,253 B2
(45) Date of Patent: Oct. 23, 2012

(54) EFFICIENT ACK TRANSMISSION FOR UPLINK SEMI-PERSISTENT SCHEDULING RELEASE IN LTE

(75) Inventors: Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 279 days.

(21) Appl. No.: 12/699,766

(22) Filed: Feb. 3, 2010

(65) Prior Publication Data
US 2010/0195629 A1    Aug. 5, 2010

Related U.S. Application Data

(60) Provisional application No. 61/150,280, filed on Feb. 5, 2009.

(51) Int. Cl.
H04J 3/00 (2006.01)
H04J 3/08 (2006.01)
H04L 1/00 (2006.01)
H04L 12/26 (2006.01)
H04B 7/212 (2006.01)

(52) U.S. Cl. ........ 370/337; 370/235; 370/326; 370/442; 370/498

(58) Field of Classification Search .................. 370/235, 370/326, 336, 337, 442, 498
See application file for complete search history.

(56) References Cited

U.S. PATENT DOCUMENTS

| 2005/0135416 A1* | 6/2005 | Ketchum et al. ............... 370/469 |
| 2009/0077259 A1* | 3/2009 | Guguen et al. ................. 709/237 |
| 2010/0091672 A1 | 4/2010 | Ishii |
| 2010/0150089 A1* | 6/2010 | Yu et al. ........................ 370/329 |
| 2010/0195575 A1* | 8/2010 | Papasakellariou et al. ... 370/328 |

FOREIGN PATENT DOCUMENTS

| EP | 2077677 | 7/2009 |
| WO | WO2008050467 | 2/2008 |
| WO | WO 2008/105421 | * 9/2008 |

OTHER PUBLICATIONS

Cai S.: "RIM Constributions for RAN 1 No. 56 meeting"[Online] Feb. 3, 2009, XP002585273 Archives of 3GPP TSG RAN WGI Retrieved from the Internet: URL:http://list.etsi.org /scripts/wa.exe?A2=ind0902&L=3gpp_tsg_ran_wgi&T=O &P=6766>[retrieved.

Grovlen A: "Nokia LTE and LTE-A contributions for RANI Nr. 56"[Online] Feb. 3, 2009, XP002585271 Archives of 3GPP TSG RAN WGI Retrieved from the Internet: URL:http://li s t . e ts i . o r g / s c r i pts/wa.exe?A2=ind0902&L=3gpp_tsg_ran_w.

Imamura D.: "LTE contributions from Panasonic for RANI No. 56"[Online] Feb. 4, 2009, XP002585274 Archives of 3GPP TSG RAN WGI Retrieved from the Internet: URL:http://11st.ets1.org/scri pts/wa.exe?A2=ind0902&L=3gpp_tsg_ran_wgl&T=0 &P=3051>[.

(Continued)

Primary Examiner — Ronald Abelson
(74) Attorney, Agent, or Firm — Nerrie M. Zohn

(57) ABSTRACT

A method, an apparatus, and a computer program product for wireless communication are provided in which an uplink semi-persistent scheduling release is received an HARQ ACK is determined whether to be transmitted in response to the received uplink semi-persistent scheduling release.

46 Claims, 12 Drawing Sheets

OTHER PUBLICATIONS

Interdigital Communications et al: Procedures for resolving collisions between SR and periodic CQI reports and Draft CRs to 36.213, 36.212 and 36.211 3GPP Draft; RI-083514, 3rd Generation Partnership Project (3GPP), Mobile Competence Centre ; 650, Route Des Lucioles, F-06921 Sophia-Antipolis Cedex; France, no prague, Czech Republic; Sep. 24, 2008.

International Search Report—PCT/US2010/023371, International Search Authority—European Patent Office—May 10, 2010.

Nokia et al: "Acknowledgement for e x p l i c i t UL SPS release" 36PP Draft; RI-090711 ACK for Explicit UL SPS Release, 3rd Generation Partnership Project (3GPP), Mobile Competence Centre ; 650, Route Des Lucioles ; F-06921 Sophia-Antipolis Cedex ; France no Athens, Greece; Feb. 3, 2009.

Panasonic: "Acknowledgement of Semi-Persistent Uplink Explicit Release" 3GPP Draft; RI-090674, 3rd Generation Partnership Project (3GPP), Mobile Competence Centre ; 650, Route Des Lucioles ; F-06921 Sophia-Antipolis Cedex ; France, no. Athens, Greece; Feb. 3, 2009.

Qualcomm Europe: "On ACK transmission for UL SPS release" 3GPP Draft; RI-090982 on ACK Transmission for UL SPS Release, 3rd Generation Partnership Project (3GPP), Mobile Competence Centre ; 650, Route Des Lucioles ; F-06921 Sophia-Antipolis Cedex; France, No. Athens, Greece; Feb. 6, 2009.

Research in Motion: "ACK for UL SPS Explicit Release" 3GPP Draft; R2-091483, 3rd Generation Partnership Project (3GPP), Mobile Competence Centre ; 650, Route Des Lucioles ; F-06921 Sophia-Antipolis Cedex ; France, no. Athens, Greece:Feb. 3, 2009.

Rim: "ACK for UL SPS release" 3GPP Draft; RI 090574, 3rd Generation Partnership Project (3GPP), Mobile Competence Centre ; 650, Route Des Lucioles ; F-06921 Sophia-Antipolis Cedex ; France, no. Athens, Greece; Feb. 4, 2009, XP050.

Young G; "[R2 No. 65] 3 docs from RIM"[Online] Feb. 2, 2009, XP002585272 Archives of 3GPP TSG RAN W63 Retrieved from the Internet: URL:http://list.ets.org/3gpp_tsg_ran_wg2. html> [retrieved on May 20, 2010] the whole document.

"LS on ACK for explicit uplink SPS release" 3GPP TSG RAN WG1 Meeting #56, R1-090554, Athens, Greece, Feb. 9-13, 2009; 3GPP TSG RAN WG2 Meeting #64bis. R2-090849, Ljubljana, Slovenia, Jan. 12-16, 2009.

Qualcomm Europe, Panasonic, "Confirmation of various UL transmission configurations", 3GPP TSG-RAN WG1 #53bis, Jun. 30-Jul. 4, 2008, R1-082550, p. 1-4.

Written Opinion—PCT/US2010/023371—ISA/EPO—Oct. 5, 2010.

\* cited by examiner

EFFICIENT ACK TRANSMISSION FOR UPLINK SEMI-PERSISTENT SCHEDULING RELEASE IN LTE

CROSS-REFERENCE TO RELATED APPLICATION(S)

Pursuant to 35 U.S.C. §119(e), this application claims the benefit of U.S. Provisional Application Ser. No. 61/150,280 filed on Feb. 5, 2009, the contents of which are hereby incorporated by reference herein in their entirety.

BACKGROUND

1. Field

The present disclosure relates generally to communication systems, and more particularly, to ACK transmission for uplink semi-persistent scheduling release in LTE.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In LTE, there currently is no procedure for transmitting a hybrid automatic repeat request (HARQ) ACK upon receiving an UL semi-persistent scheduling (SPS) release. As such, there is a need for an apparatus and a method for efficient ACK transmission upon receiving an UL SPS release.

SUMMARY

In an aspect of the disclosure, a method, an apparatus, and a computer program product for wireless communication are provided in which an uplink semi-persistent scheduling release is received an HARQ ACK is determined whether to be transmitted in response to the received uplink semi-persistent scheduling release.

In an aspect of the disclosure, a method, an apparatus, and a computer program product for wireless communication are provided in which an UL SPS release is received, an HARQ ACK is determined to be transmitted in a first subframe in response to the received UL SPS release, and a scheduling request (SR) is determined to be transmitted in a second subframe. In addition, the scheduling request and the HARQ-ACK are determined whether to be transmitted in the first subframe based on whether there is a collision between the scheduling request and the HARQ-ACK. The collision occurs at least when the first subframe and the second subframe are the same subframe. Furthermore, at least one of the scheduling request and the HARQ-ACK are transmitted based on the determination whether to transmit.

DETAILED DESCRIPTION

Figure 1:
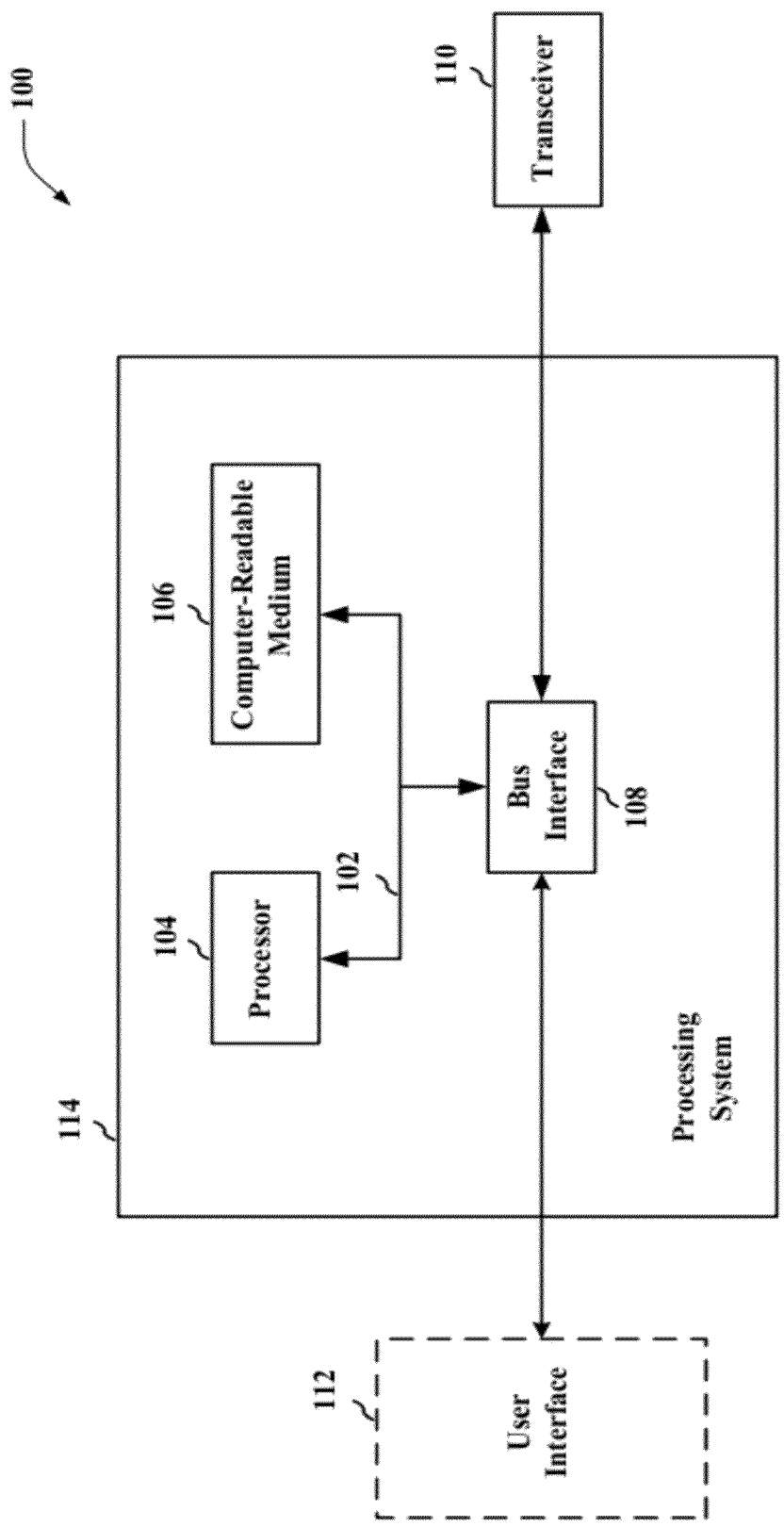
FIG. 1 is a conceptual diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
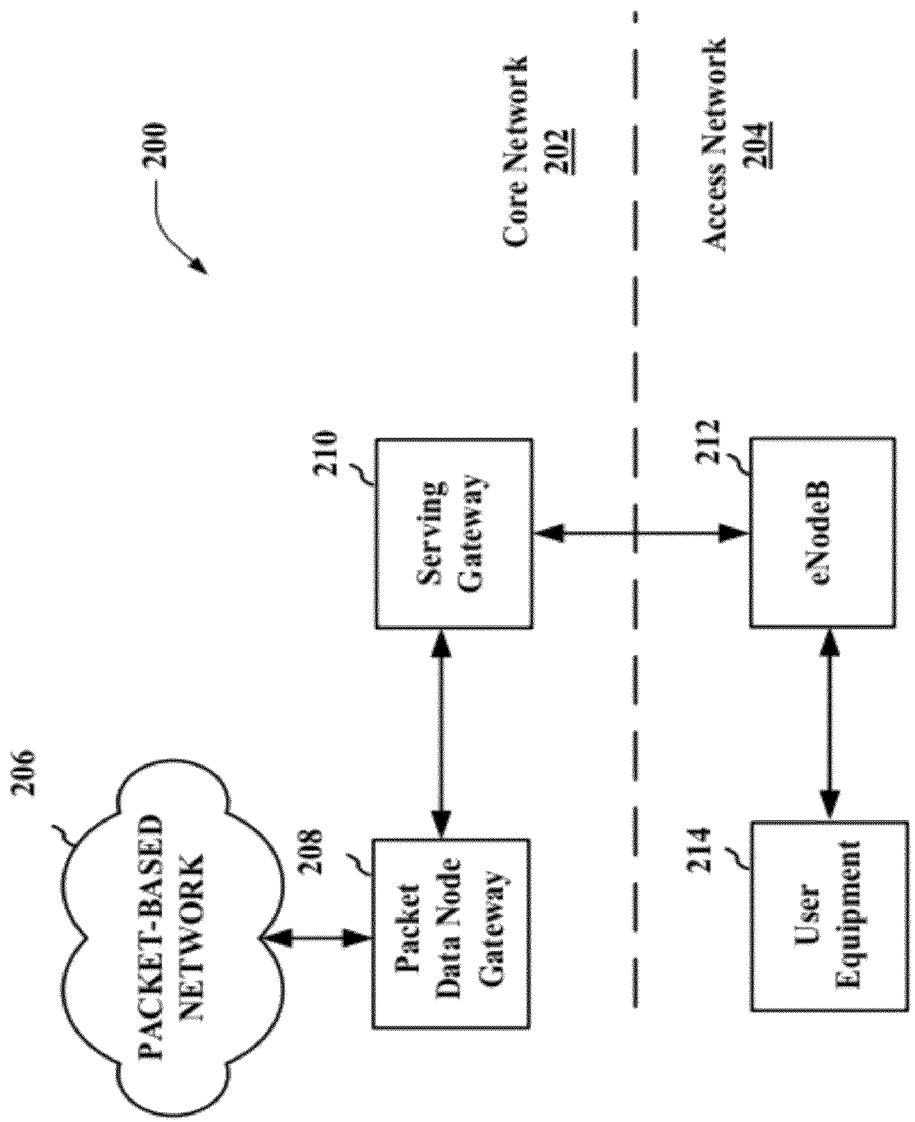
FIG. 2 is a conceptual diagram illustrating an example of a network architecture.

An example of a telecommunications system employing various apparatus will now be presented with reference to an LTE network architecture as shown in FIG. 2. The LTE network architecture 200 is shown with a core network 202 and an access network 204. In this example, the core network 202 provides packet-switched services to the access network 204, however, as those skilled in the art will readily appreciate, the various concepts presented throughout this disclosure may be extended to core networks providing circuit-switched services.

The access network 204 is shown with a single apparatus 212, which is commonly referred to as an evolved NodeB in LTE applications, but may also be referred to by those skilled in the art as a base station, a base transceiver station, a radio base station, a radio transceiver, a transceiver function, a basic service set (BSS), an extended service set (ESS), or some other suitable terminology. The eNodeB 212 provides an access point to the core network 202 for a mobile apparatus 214. Examples of a mobile apparatus include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The mobile apparatus 214 is commonly referred to as user equipment (UE) in LTE applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The core network 202 is shown with several apparatus including a packet data node (PDN) gateway 208 and a serving gateway 210. The PDN gateway 210 provides a connection for the access network 204 to a packet-based network 206. In this example, the packet-based network 206 is the Internet, but the concepts presented throughout this disclosure are not limited to Internet applications. The primary function of the PDN gateway 208 is to provide the UE 214 with network connectivity. Data packets are transferred between the PDN gateway 208 and the UE 214 through the serving gateway 210, which serves as the local mobility anchor as the UE 214 roams through the access network 204.

Figure 3:
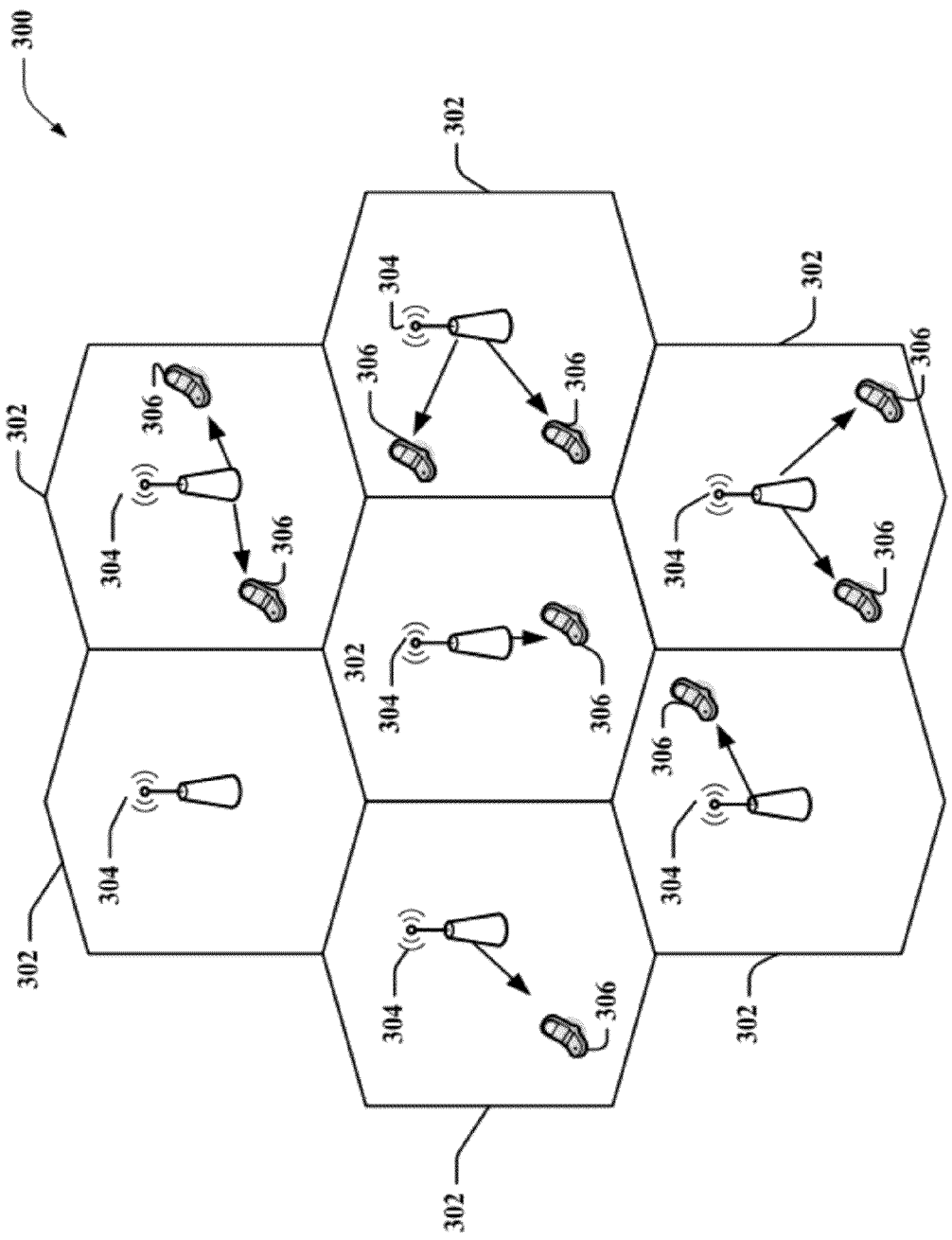
FIG. 3 is a conceptual diagram illustrating an example of an access network.

An example of an access network in an LTE network architecture will now be presented with reference to FIG. 3. In this example, the access network 300 is divided into a number of cellular regions (cells) 302. An eNodeB 304 is assigned to a cell 302 and is configured to provide an access point to a core network 202 (see FIG. 2) for all the UEs 306 in the cell 302. There is no centralized controller in this example of an access network 300, but a centralized controller may be used in alternative configurations. The eNodeB 304 is responsible for all radio related functions including radio bearer control, admission control, mobility control, scheduling, security, and connectivity to the serving gateway 210 in the core network 202 (see FIG. 2).

The modulation and multiple access scheme employed by the access network 300 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeB 304 may have multiple antennas supporting MIMO technology. The use of MIMO technology enables the eNodeB 304 to exploit the spatial domain to support spatial multiplexing, beamforming, and transmit diversity.

Spatial multiplexing may be used to transmit different streams of data simultaneously on the same frequency. The data steams may be transmitted to a single UE 306 to increase the data rate or to multiple UEs 306 to increase the overall system capacity. This is achieved by spatially precoding each data stream and then transmitting each spatially precoded stream through a different transmit antenna on the downlink. The spatially precoded data streams arrive at the UE(s) 306 with different spatial signatures, which enables each of the UE(s) 306 to recover the one or more the data streams destined for that UE 306. On the uplink, each UE 306 transmits a spatially precoded data stream, which enables the eNodeB 304 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR).

Figure 4:
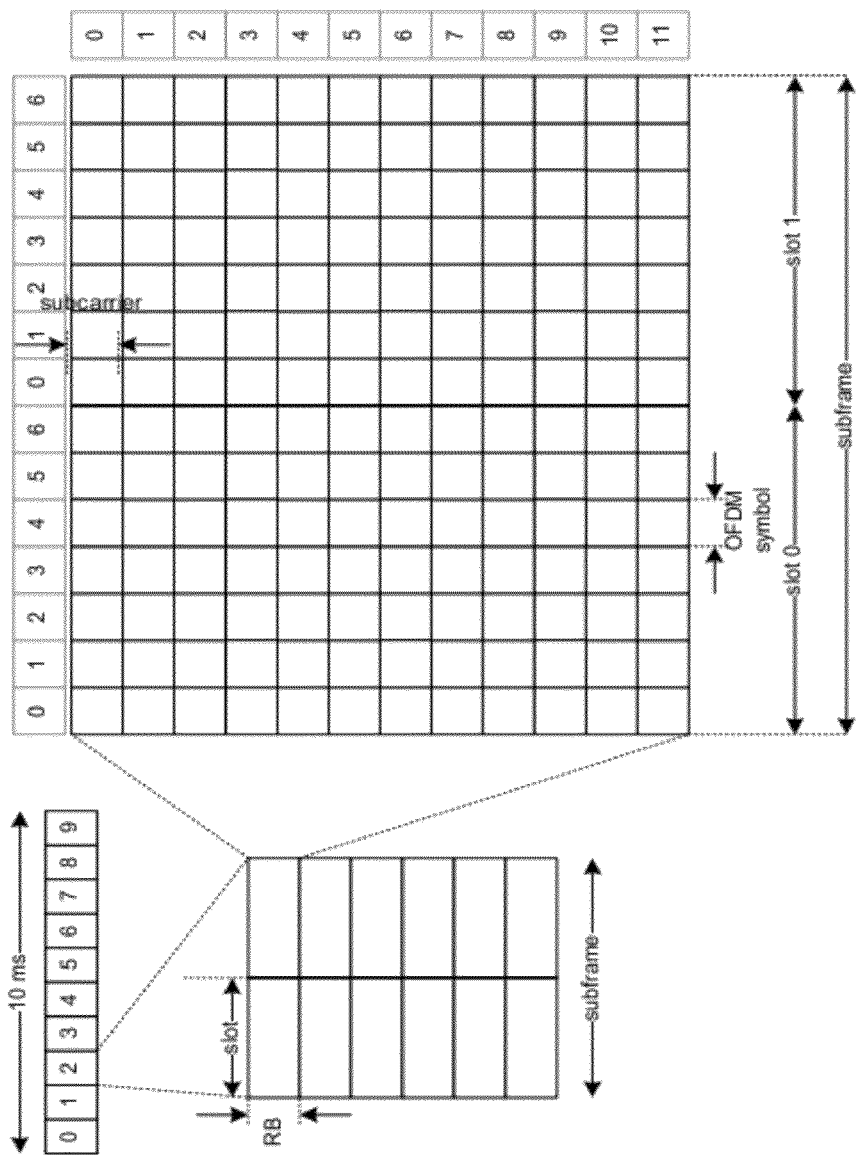
FIG. 4 is a conceptual diagram illustrating an example of a frame structure for use in an access network.

Various frame structures may be used to support the DL and UL transmissions. An example of a DL frame structure will now be presented with reference to FIG. 4. However, as those skilled in the art will readily appreciate, the frame structure for any particular application may be different depending on any number of factors. In this example, a frame (10 ms) is divided into 10 equally sized sub-frames. Each sub-frame includes two consecutive time slots.

A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. The number of bits carried by each resource element depends on the modulation scheme. Thus, the more resource blocks that a UE receives and the higher the modulation scheme, the higher the data rate for the UE.

Figure 5:
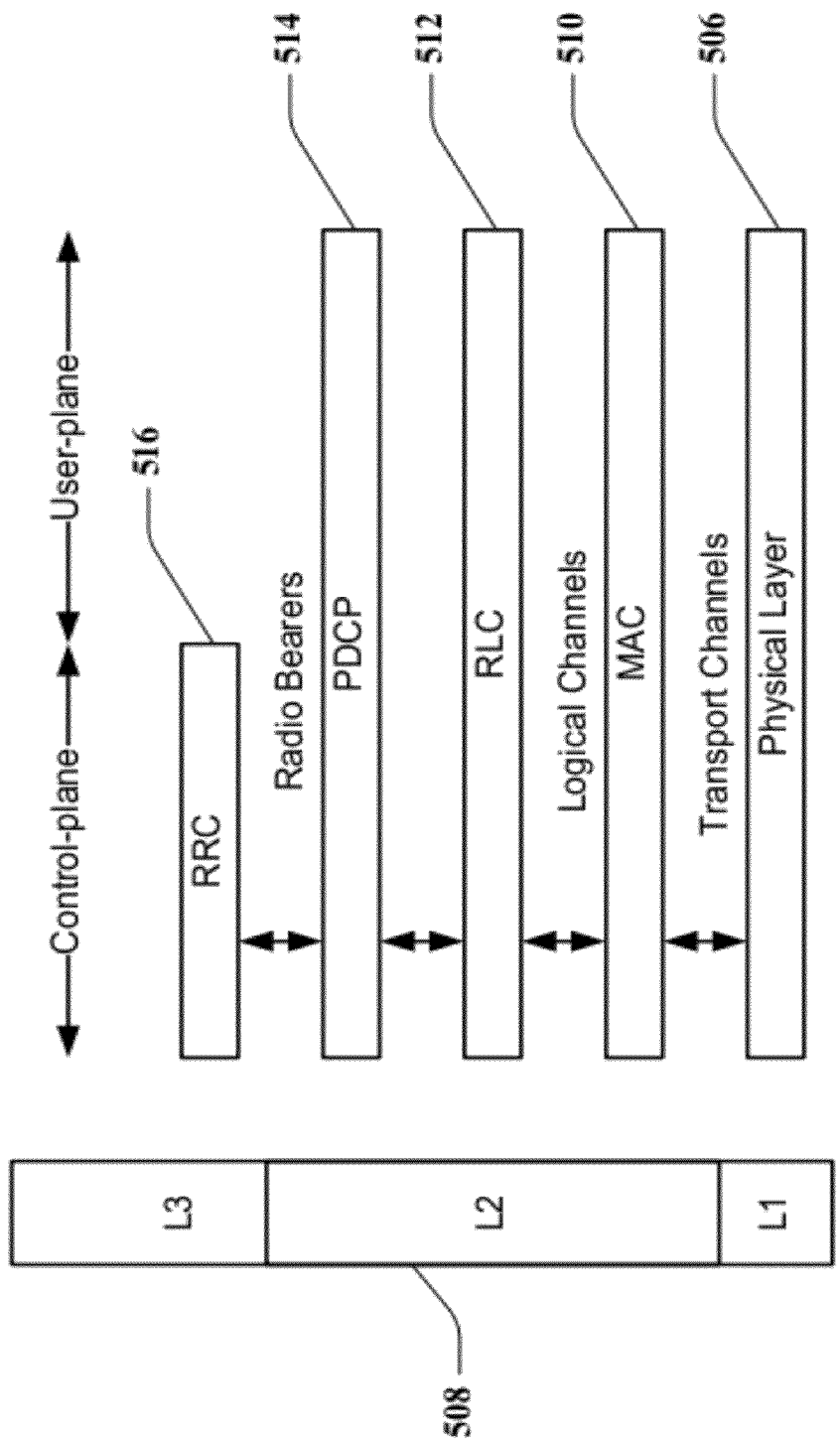
FIG. 5 is a conceptual diagram illustrating an example of a radio protocol architecture for the user and control plane.

The radio protocol architecture may take on various forms depending on the particular application. An example for an LTE system will now be presented with reference to FIG. 5. FIG. 5 is a conceptual diagram illustrating an example of the radio protocol architecture for the user and control planes.

Turning to FIG. 5, the radio protocol architecture for the UE and eNodeB is shown with three layers: Layer 1, Layer 2, and Layer 3. Layer 1 is the lowest lower and implements various physical layer signal processing functions. Layer 1 will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 208 (see FIG. 2) on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to HARQ. The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control pane, the radio protocol architecture for the UE and eNodeB is substantially the same for the physical layer 506 and the L2 layer 508 with the exception that there is no header compression function for the control plane. The control pane also includes a radio resource control (RRC) sublayer 516 in Layer 3. The RRC sublayer 516 is responsible for obtaining radio resources (i.e., radio bearers) and for configuring the lower layers using RRC signaling between the eNodeB and the UE.

Figure 6:
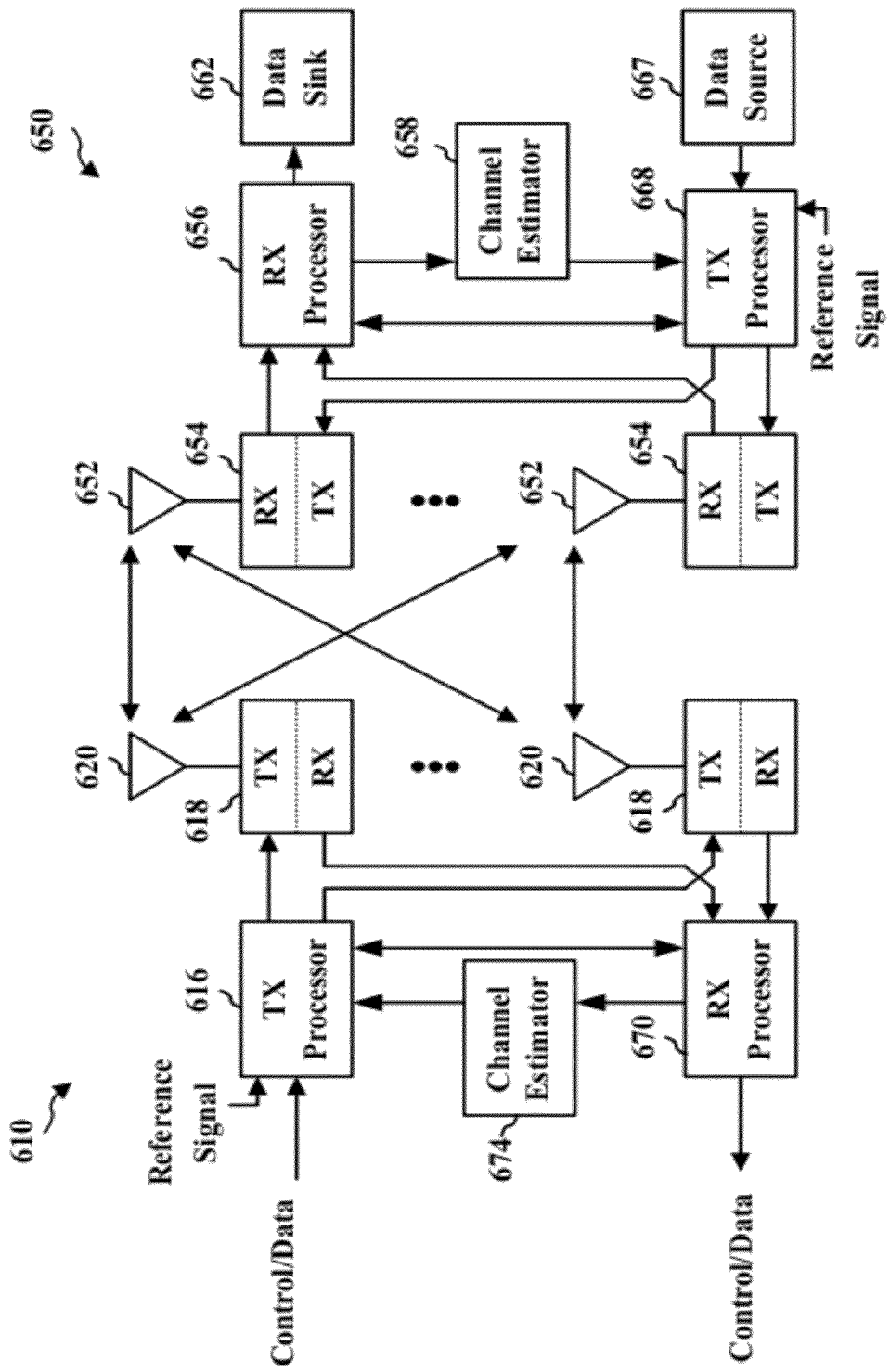
FIG. 6 is a conceptual diagram illustrating an example of an eNodeB and UE in an access network.

FIG. 6 is a block diagram of an eNodeB 610 in communication with a UE 650 in an access network. In the DL, upper layer packets from the core network are provided to a transmit (TX) processor 616. The TX processor 616 implements the functionality of the L1, L2, and L3 layers. With respect to L2 layer functionality, the TX processor 616 compresses the headers of the upper layer packets, ciphers the packets, segments the ciphered packets, reorders the segmented packets, multiplexes the data packets between logical and transport channels, and allocates radio resources to the UE 650 based on various priority metrics. The TX processor 616 is also responsible for HARQ operations, retransmission of lost packets, and signaling to the UE 650 based on controls from the L3 layer.

With respect to L1 layer functionality, the TX processor 616 implements various signal processing functions for the physical layer. The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656.

The RX processor 656 implements various signal processing functions of the L1, L2, and L3 layers. With respect to the L1 layer functionality, the RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the L2 layer.

With respect to the L2 layer functionality, the RX processor 656 provides demultiplexing between transport and logical channels, reassembles the data packets into upper layer packets, deciphers the upper layer packets, decompresses the headers and processes the control signals. The upper layer packets are then provided to a data sink 662, which represents all the protocol layers above the L2 layer. The RX processor 656 is also responsible for error detection using an acknowledgement (ACK) and/or negative acknowledgment (NACK) protocol to support HARQ operations. The control signals are provided to the L3 layer.

In the UL, a data source 667 is used to provide data packets to a transmit (TX) processor 668. The data source 667 represents all protocol layers above the L2 layer (L2). Similar to the functionality described in connection with the DL transmission by the eNodeB 610, the TX processor 668 implements the L1, L2, and L3 layers for the user plane and the control plane. Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 implements the L1, L2, and L3 layers. Upper layer packets from the RX processor may be provided to the core network and control signals may be provided to the L3 layer.

The eNodeB 610 performs dynamic scheduling and semi-persistent scheduling (SPS). In dynamic scheduling, resources are assigned to users based on continual scheduling on the L1/L2 control channels. For dynamic scheduling, resources are re-allocated dynamically and are derived by the UE 650 based on the first (i.e., minimum) control channel element (CCE) of the corresponding physical DL control channel (PDCCH) message. In SPS, a set of resources and transport formats are pre-allocated. SPS parameters (e.g., periodicity) are configured semi-statically through RRC signaling (i.e., the RRC layer in L3). SPS is activated and released (i.e., deactivated) in L2 through the PDCCH. In response to a DL transmission on the physical DL shared channel (PDSCH), the UE 650 is configured to transmit an HARQ-ACK/NACK. In addition, in response to a DL SPS release, the UE 650 is configured to transmit an HARQ-ACK. The ACK/NACK for the DL transmission is dynamically derived. The ACK for the DL SPS release is configured semi-statically through RRC signaling. The ACK/NACK for the dynamically scheduled DL transmission and the ACK for the DL SPS release do not co-exist at the same time.

When the ACK/NACK for the DL transmission or the ACK for the DL SPS release are to be transmitted by the UE 650 at the same time as a scheduling request (SR), the ACK is multiplexed with the SR and is transmitted using SR resources (which are configured semi-statically through RRC signaling). Table 1 below lists several configurations with SR for transmitting SR, data, and various combinations of UL control information (UCI) on the physical UL shared channel (PUSCH) or SR and various combinations of UCI on the physical UL control channel (PUCCH). The UCI includes channel quality indicator (CQI) feedback, an HARQ-ACK/NACK for a DL transmission, an HARQ-ACK for a DL SPS release, and a sounding reference signal (SRS). The "x" denotes the presence of the particular information and the "o" denotes that the particular information may or may not be present. The presence of SR means a positive SR.

TABLE 1

Data/UCI Combinations With SR Transmission

| Conf # | Data | CQI | ACK | SR | SRS | Comments |
|---|---|---|---|---|---|---|
| 2 | | | | x | | SR alone sent on PUCCH resources for SR (LR configured) using PUCCH format 1. |
| 3 | | | | x | x | Considered as a "misconfiguration", hence SRS is dropped unless shortened PUCCH format 1/1a/1b is configured. In this case, SR is transmitted with shortened PUCCH format 1 and SRS is transmitted normally. |
| 6 | | | X | x | | Both transmitted using PUCCH resources for SR modulated by ACK 1-2 bits (B/QPSK) using PUCCH format 1a or 1b. |
| 7 | | | X | x | x | Based on configuration 3, SRS transmission is dropped unless shortened PUCCH format 1/1a/1b is configured. If SRS transmission is dropped, SR and ACK are transmitted according to configuration 6. If SRS transmission is not dropped, SR and ACK are transmitted using PUCCH resources for SR modulated by ACK 1-2 bits (B/QPSK) with a shortened PUCCH format 1a/1b, and SRS is transmitted normally. |
| 10 | | X | | x | | Considered as a "misconfiguration", hence CQI is dropped. |
| 11 | | X | | x | x | Based on configuration 3, SRS transmission is dropped unless shortened PUCCH format 1/1a/1b is configured. If SRS transmission is dropped, SR and CQI are transmitted according to configuration 10 i.e. CQI is also dropped, and hence, only SR is transmitted. If SRS transmission is not dropped, CQI is dropped, SR is transmitted using shortened PUCCH format 1 and SRS is transmitted normally. |
| 14 | | X | x | x | | Based on configuration 10, CQI transmission is dropped, and ACK and SR are transmitted according to configuration 6. |
| 18 | x | ○ | ○ | x | ○ | PUSCH resources used. The scheduling request may be sent as a MAC PDU. When data consists of only CQI, it is considered as a "misconfiguration", hence Drop aperiodic CQI; SR is transmitted according to configuration 2. |

As shown in Table 1, when an SR is transmitted by itself, the SR is transmitted using PUCCH format 1, and when an SR is transmitted with an ACK, the ACK and SR are transmitted using PUCCH format 1a or 1b. PUCCH format 1 carries no explicit bit, but information is carried by the presence/absence of transmission of PUCCH from the UE. PUCCH format 1a carries one explicit bit and PUCCH format 1b carries two explicit bits. The ACK and the SR may also be transmitted with data on the physical UL shared channel (PUSCH) (see configuration 18). The PUCCH and the PUSCH cannot be transmitted simultaneously.

Figure 7:
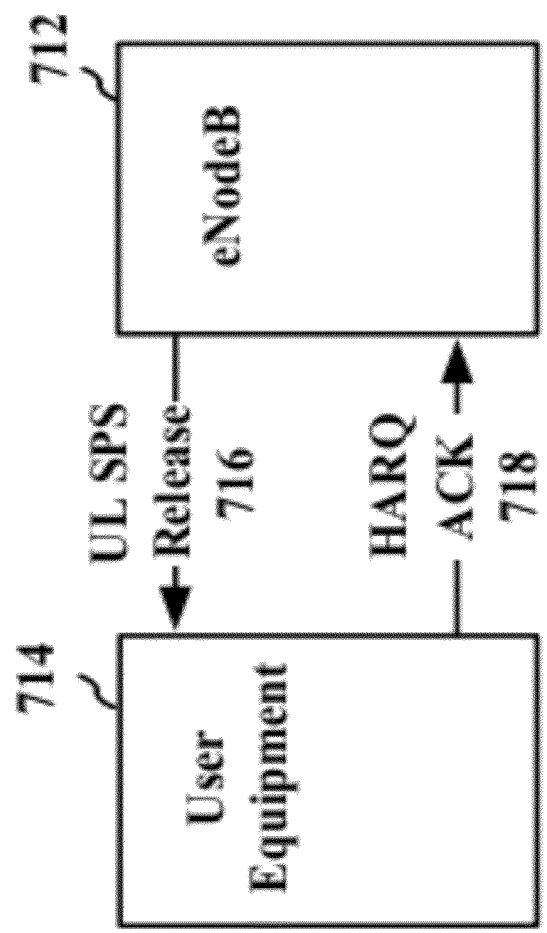
FIG. 7 is a conceptual diagram illustrating a UE and an eNodeB in communication.

FIG. 7 is a conceptual diagram illustrating a UE 714 and an eNodeB 712 in communication. As illustrated in FIG. 7, in one configuration, when a UE 714 receives an UL SPS release 716, the UE 714 sends an HARQ-ACK 718 to the eNodeB 712. Because the UE 714 will either send an ACK in response to an UL SPS release or nothing when there is no UL SPS release (i.e., the UE 714 will never send a NACK in response to an UL SPS release), the ACK transmission 718 in response to an UL SPS release 716 may be treated similarly to an SR transmission. That is, the same physical channels and modulation, multiplexing and coding channel, and physical layer procedures for an SR can be used for ACK transmission upon receiving an UL SPS release. As such, the timing relationship between an UL SPS release 716 through the PDCCH and the transmission of the corresponding ACK 718 may be the same as between data received through the PDSCH and the transmission of the corresponding ACK/NACK. Furthermore, the PUCCH resource for the ACK 718 may be the same resource utilized by an SR and defined through RRC signaling. However, in one configuration, the PUCCH resource utilized for the ACK 718 is not the SR resource, but rather is derived similarly as the dynamically scheduled PDSCH, i.e., based on the first control channel element (CCE), denoted by $n_{PUCCH}^{ULSPS} = n_{CCE} + N_{PUCCH}^{(1)}$, within the PDCCH message. The variable $n_{PUCCH}^{ULSPS}$ represents the offset within the first control element of the PDCCH message.

If in a subframe, an ACK for UL SPS release is to be transmitted by itself, the ACK may be transmitted according to configuration 2 using PUCCH format 1 using PUCCH resource index $n_{PUCCH}^{ULSPS}$. Alternatively, the ACK may be transmitted using the SR resource when the eNodeB 610 knows that an SR is not scheduled to be able to be sent by the UE 650.

If an ACK for UL SPS release and an ACK/NACK for a DL transmission or an ACK for DL SPS release occur in the same subframe without an SR transmission, both the ACK for UL SPS release and the ACK/NACK for DL Tx are transmitted according to configuration 6 using PUCCH format 1a or 1b using either the SR resource (if the eNodeB 610 knows that it is not receiving an SR) or the PUCCH resource index $n_{PUCCH}^{ULSPS}$. Similarly, for other combinations of information (i.e., configurations 3, 7, 10, 11, 14, 18), the ACK for UL SPS release is transmitted instead of SR using either the PUCCH resource index $n_{PUCCH}^{ULSPS}$ or the SR resource. As discussed supra, the SR resource may be used, but only if the UE 650 is not configured to send an SR at that time.

Accordingly, when there is no collision between SR and the ACK for UL SPS release, the ACK for UL SPS release may be transmitted as the SR is transmitted in Table 1. In one configuration, the ACK is transmitted using the PUCCH resource index $n_{PUCCH}^{ULSPS}$. In another configuration, the ACK is transmitted using the SR resource. The ACK may be transmitted using the SR resource when the when the eNodeB 610 would not perceive the reception of the ACK as an SR.

When an SR is scheduled or a positive SR is transmitted when an ACK for UL SPS release should be transmitted, a collision occurs. In a first alternative A1, the collision is defined as occurring in subframe n when the subframe n is configured as the SR transmission instance. In a second alternative A2, the collision is defined as occurring in subframe n only when a positive SR is transmitted at subframe n. The first alternative A1 may be easier to implement than the second alternative A2.

When a collision occurs between the ACK for UL SPS release and the SR and there is no PUSCH transmission, there are three possible alternatives: (B1) the ACK for UL SPS release is dropped, (B2) the SR is dropped, or (B3) both the ACK for UL SPS release and the SR are transmitted using a format that would allow for the transmission of the additional information. For example, in configuration 2, the ACK for UL SPS release may be dropped and the SR transmitted using PUCCH format 1 according to alternative B1 or the SR may be dropped and the ACK for UL SPS release transmitted using PUCCH format 1 according to alternative B2. Alternatively, if a different format is used, both the ACK for UL SPS release and the SR may be transmitted according to alternative B3. For another example, in configuration 6, the ACK for UL SPS release may be dropped and the SR transmitted with the ACK for DL (i.e., ACK/NACK for DL Tx or ACK for DL SPS release) using PUCCH format 1a or 1b according to alternative B1 or the SR may be dropped and the ACK for UL SPS release transmitted with the ACK or ACK/NACK for DL using PUCCH format 1a or 1b according to alternative B2. Alternatively, if a different format is used, the ACK for UL SPS release, the ACK for DL, and the SR may be transmitted according to alternative B3.

When a collision occurs between the ACK for UL SPS release and the SR and there is a PUSCH transmission, there are three possible configurations: (C1) the ACK for UL SPS release is dropped and the SR is transmitted as a MAC packet data unit (PDU), (C2) the SR is dropped and the ACK for UL SPS release is transmitted as a MAC PDU, or (C3) both the ACK for UL SPS release and the SR are transmitted as a MAC PDU.

The alternatives A1, B1, and C1 are the simplest to implement. By having A1, B1, and C1, a UE will never transmit SR and ACK for UL SPS release at the same time. That is, transmissions of SR and ACK for UL SPS release are mutually orthogonal in time. As such, the eNodeB 610 can receive an SR transmission, an ACK transmission for UL SPS release, or a transmission with neither SR nor ACK for UL SPS release. As a result, the same detection algorithm for SR at the eNodeB 610 may be re-used for the detection of ACK for UL SPS release.

Accordingly, the ACK for UL SPS release is treated the same as an SR transmission. Such treatment allows for the utilization of existing multiplexing rules defined for SR, without the need to design new rules handling ACK/NACK transmission, especially for TDD. Specifically, in one configuration, the UE does the following regarding ACK transmission for UL SPS release:

If colliding with an SR transmission instance, do not transmit an ACK upon receiving an UL SPS release.

Otherwise, the same physical channels and modulation, multiplexing and channel coding, and physical layer procedures for SR are used for ACK transmission for UL SPS release. If alternative A1 is selected, the ACK may be transmitted either on the PUCCH resource derived based on the first CCE of the corresponding PDCCH or the SR resource. However, if alternative A2 is selected, the ACK is transmitted on the PUCCH resource derived based on the first CCE of the corresponding PDCCH so that the eNodeB 610 can distinguish an ACK from an SR.

Figure 8:
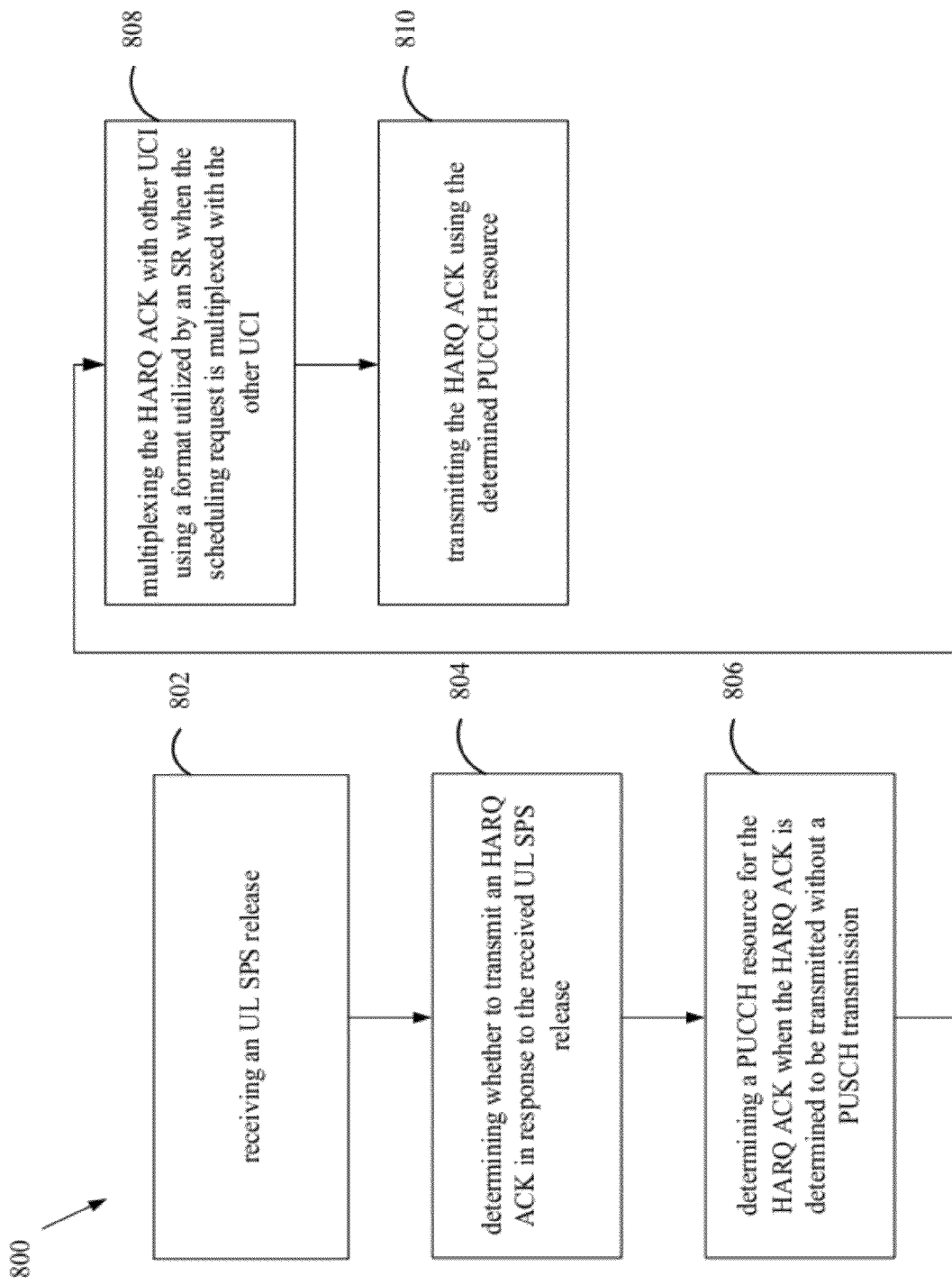
FIG. 8 is a flow chart of a method of wireless communication.

FIG. 8 is a flow chart 800 of a method of wireless communication. The method includes receiving an UL SPS release (802), and determining whether to transmit an HARQ ACK in response to the received UL SPS release (804). When the HARQ ACK is transmitted without a PUSCH transmission (i.e., without data on the PUSCH), the method may further include determining a PUCCH resource for the HARQ ACK (806) and transmitting the HARQ ACK using the determined PUCCH resource (810). In one configuration, the method may further include multiplexing the HARQ ACK with other UCI using a format (see Table 1) utilized by an SR when the SR is multiplexed with the other UCI (808). The UCI includes at least one of CQI feedback, an HARQ ACK/NACK in response to a DL transmission, an HARQ ACK in response to a DL SPS release, and an UL SRS.

In one configuration, the method may further include receiving a PDCCH message. The PUCCH resource is defined in a first control channel element received in the PDCCH message. Alternatively, the PUCCH resource is a resource for an SR defined through RRC signaling.

Figure 9:
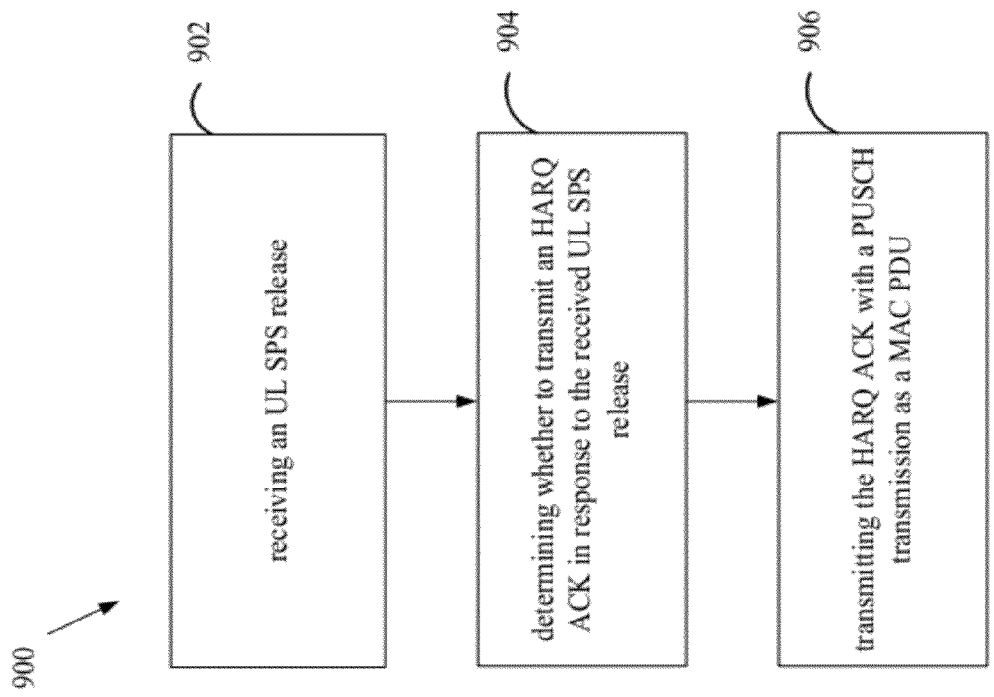
FIG. 9 is another flow chart of a method of wireless communication.

FIG. 9 is a flow chart 900 of a method of wireless communication. When there is a PUSCH transmission, the method may include receiving an UL SPS release (902), determining whether to transmit an HARQ ACK in response to the received UL SPS release (904), and transmitting the HARQ ACK as a MAC PDU with the data on the PUSCH.

Figure 10:
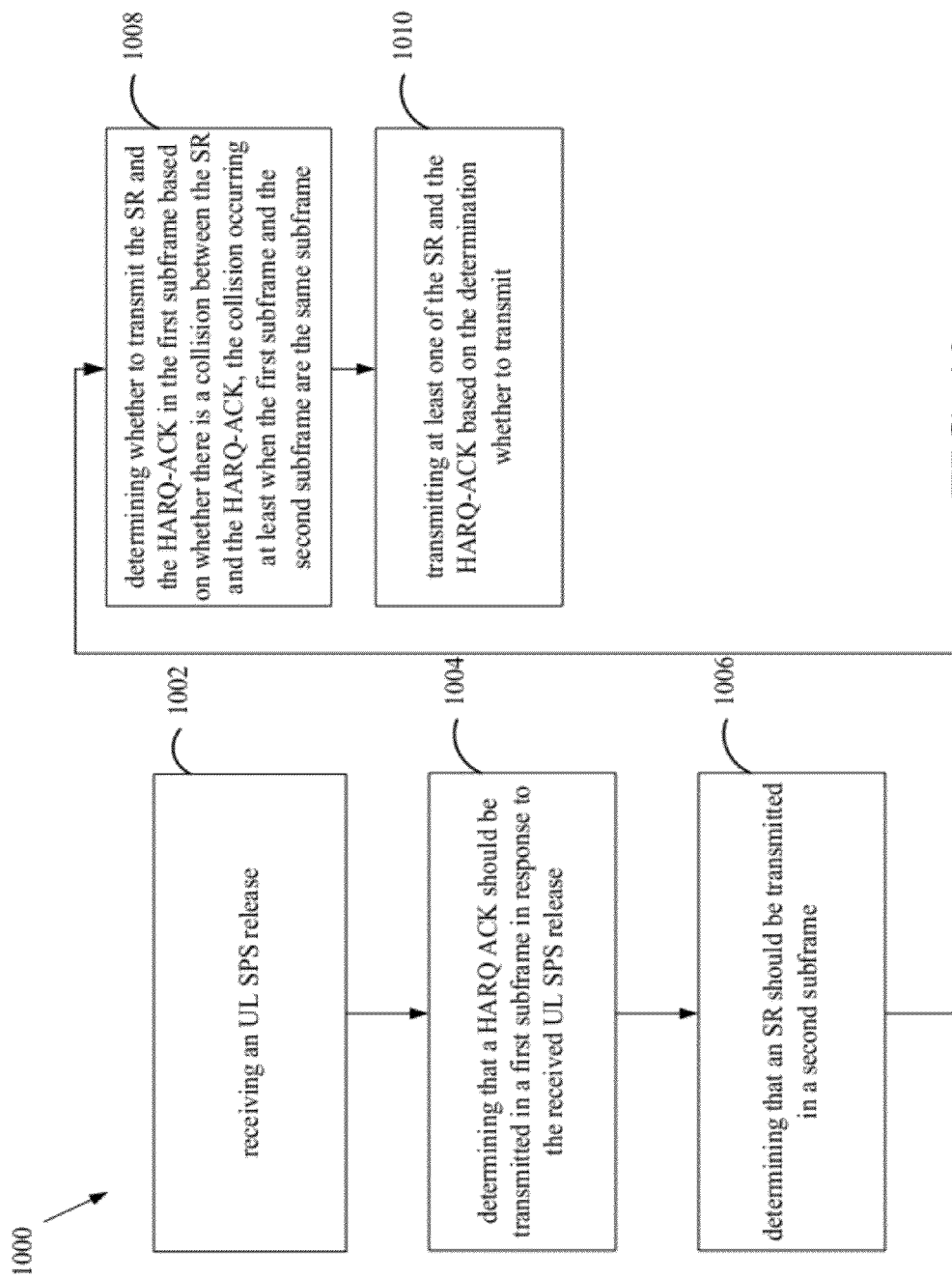
FIG. 10 is yet another flow chart of a method of wireless communication.

FIG. 10 is a flow chart 1000 of a method of wireless communication. The method includes receiving an UL SPS release (1002), determining that an HARQ ACK should be transmitted in a first subframe in response to the received UL SPS release (1004), and determining that an SR should be transmitted in a second subframe (1006). The method further includes determining whether to transmit the SR and the HARQ-ACK in the first subframe based on whether there is a collision between the SR and the HARQ-ACK (1008). The collision occurs at least when the first subframe and the second subframe are the same subframe (1008). The method further includes transmitting at least one of the SR and the HARQ-ACK based on the determination whether to transmit (1010).

When there is no collision and no PUSCH transmission, the method may further include receiving a PDCCH message, and determining a resource for the HARQ-ACK based on a PUCCH resource defined in a first control channel element received in the PDCCH message. In such a configuration, the HARQ-ACK is transmitted without the SR using the PUCCH resource. Alternatively, when there is no collision and no PUSCH transmission, the method may further include determining a resource for the HARQ-ACK based on a resource for the scheduling request. In such a configuration, the HARQ-ACK is transmitted without the SR using the resource for the SR defined through RRC signaling. When there is a PUSCH transmission and no collision, the HARQ-ACK is transmitted with the PUSCH transmission as a MAC PDU.

In one configuration, the collision occurs only when the first subframe and the second subframe are the same subframe (i.e., alternative A2). In one configuration, the method further includes receiving a configuration for transmitting scheduling requests in a plurality of subframes, the plurality of subframes including the second subframe, and the collision occurs only when the first subframe is one of the plurality of subframes (i.e., alternative A1).

In one configuration, when there is a collision and no PUSCH transmission, the method may further include dropping the HARQ-ACK transmission and transmitting the SR request without the HARQ-ACK (i.e., alternative B1); dropping the SR transmission and transmitting the HARQ-ACK (i.e., alternative B2); or transmitting both the HARQ-ACK and the SR together on the PUCCH using a format that carries at least one more bit than a format used when sending the SR without the HARQ-ACK (i.e., alternative B3).

In one configuration, when there is a collision and a PUSCH transmission, the method may further include dropping the HARQ-ACK transmission and transmitting the SR with the PUSCH transmission and without the HARQ-ACK as a MAC PDU (i.e., alternative C1); dropping the SR transmission and transmitting the HARQ-ACK with the PUSCH transmission and without the SR as a MAC PDU (i.e., alternative C2); or transmitting both the HARQ-ACK and the SR with the PUSCH transmission as a MAC PDU (i.e., alternative C3).

Figure 11:
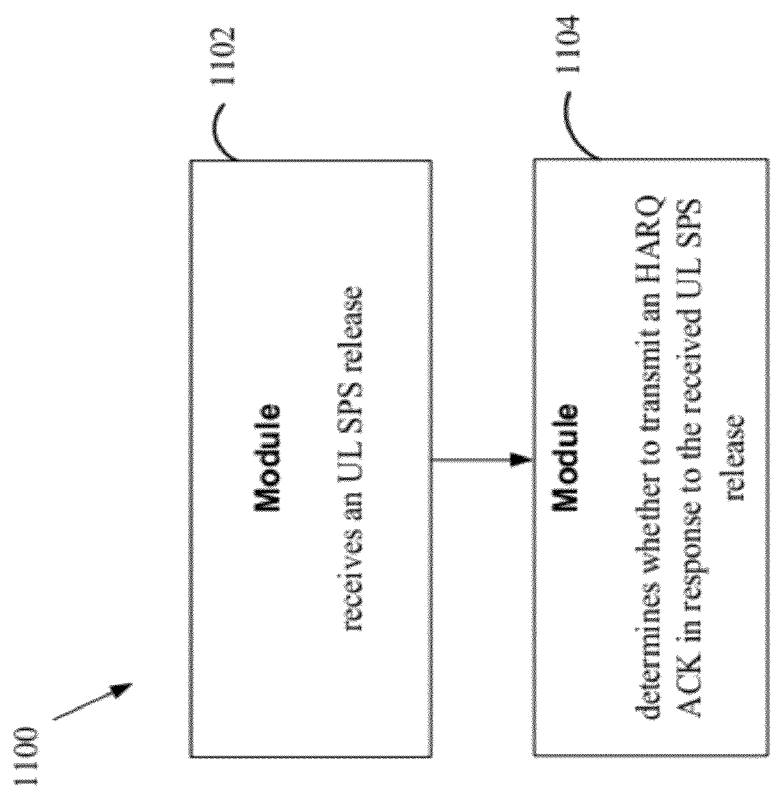
FIG. 11 is a conceptual block diagram illustrating the functionality of an exemplary apparatus.

FIG. 11 is a conceptual block diagram 1100 illustrating the functionality of an exemplary apparatus 100, which may be the eNodeB 610. The apparatus 100 includes a module 1102 that receives an UL SPS release and a module 1104 that determines whether to transmit an HARQ ACK in response to the received UL SPS release.

Figure 12:
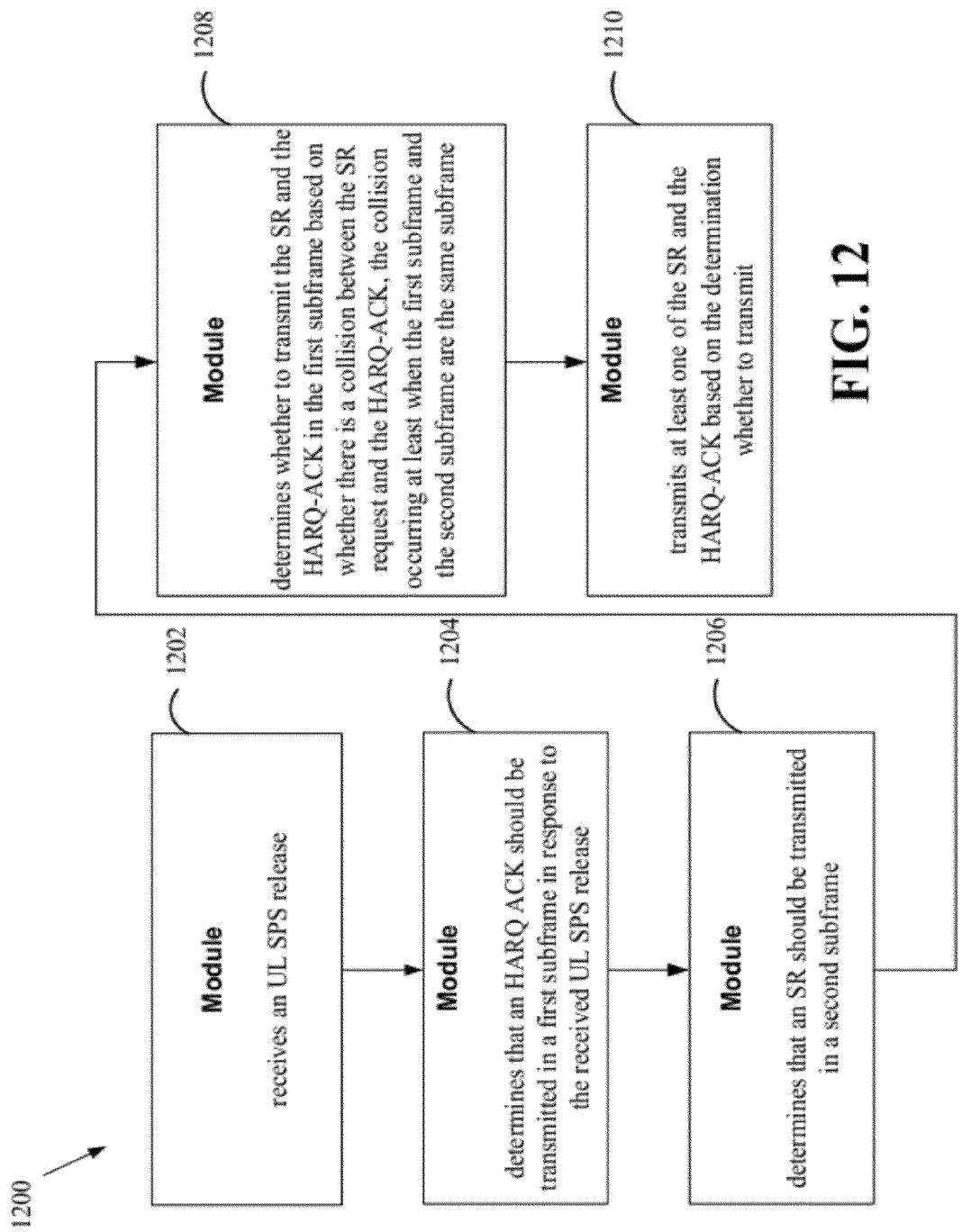
FIG. 12 is another conceptual block diagram illustrating the functionality of an exemplary apparatus.

FIG. 12 is a conceptual block diagram 1200 illustrating the functionality of an exemplary apparatus 100. The apparatus 100 includes a module 1202 that receives an UL SPS release, a module 1204 that determines that an HARQ ACK should be transmitted in a first subframe in response to the received UL SPS release, and a module 1206 that determines that an SR should be transmitted in a second subframe. The apparatus 100 further includes a module 1208 that determines whether to transmit the SR and the HARQ-ACK in the first subframe based on whether there is a collision between the SR request and the HARQ-ACK. The collision occurs at least when the first subframe and the second subframe are the same subframe. The apparatus 100 further includes a module 1210 that transmits at least one of the SR and the HARQ-ACK based on the determination whether to transmit.

In one configuration, the apparatus 100 for wireless communication includes means for receiving an UL SPS release, and means for determining whether to transmit an HARQ ACK in response to the received UL SPS release. Alternatively, the apparatus 100 includes means for receiving an UL SPS release, means for determining that an HARQ ACK should be transmitted in a first subframe in response to the received UL SPS release, and means for determining that an SR should be transmitted in a second subframe. The apparatus 100 further includes means for determining whether to transmit the SR and the HARQ-ACK in the first subframe based on whether there is a collision between the SR and the HARQ-ACK. The collision occurs at least when the first subframe and the second subframe are the same subframe. The apparatus 100 further includes means for transmitting at least one of the SR and the HARQ-ACK based on the determination whether to transmit. The aforementioned means is the processing system 114 configured to perform the functions recited by the aforementioned means. As described supra, the processing system 114 includes the TX Processor 616 and the RX Processor 670. As such, in one configuration, the aforementioned means may be the TX Processor 616 and the RX Processor 670 configured to perform the functions recited by the aforementioned means.

The ACK transmission in response to an UL SPS release and its relationship to the transmission of a SR has been discussed supra in relation to a single-carrier waveform in which PUSCH and PUCCH are not transmitted at the same time and the ACK in response to an UL SPS release is multiplexed with other UCI on a PUCCH transmission and with a MAC PDU on a PUSCH transmission. The UL single-carrier waveform may be relaxed to have a clustered DFT-S-OFDM where there may be parallel PUCCH and PUSCH in one carrier. The PUSCH resource itself is no longer necessarily contiguous. The PUCCH itself may not necessarily follow the multiplexing rules outlines in Table 1. In such a configuration, the ACK for UL SPS release may not be multiplexed with other UCI and transmitted in the same resource, but rather, may be transmitted in parallel with other UCI and transmitted in a separate resource. Furthermore, the ACK for UL SPS release may not be multiplexed with data and transmitted in the MAC PDU, but rather, may be transmitted in parallel with the MAC PDU. In another configuration, the same rules defined for an SR transmission when the PUSCH and the PUCCH are transmitted in parallel may also apply to an ACK for UL SPS release transmission. That is, an ACK for UL SPS release may never be retransmitted at the same time as an SR, and when an ACK is transmitted in response to an UL SPS release, the ACK is transmitted using the multiplexing rules, but not necessarily the same resource, as the SR. In another configuration, the ACK for UL SPS release and the SR may be transmitted simultaneously, using different resources, or using the same resource by a utilizing a format that would convey information on both the ACK for UL SPS release and the SR to an eNodeB.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method of wireless communication, comprising:
   receiving an uplink semi-persistent scheduling release;
   determining whether to transmit a hybrid automatic repeat request (HARQ) ACK in response to the received uplink semi-persistent scheduling release;
   determining a physical uplink control channel (PUCCH) resource for the HARQ ACK when the HARQ ACK is determined to be transmitted without a physical uplink shared channel (PUSCH) transmission; and
   transmitting the HARQ ACK using the determined PUCCH resource.

2. The method of claim 1, further comprising receiving a physical downlink control channel (PDCCH) message, wherein the PUCCH resource is defined in a first control channel element received in the PDCCH message.

3. The method of claim 1, wherein the PUCCH resource is a resource for a scheduling request defined through radio resource control (RRC) signaling.

4. The method of claim 1, further comprising: before transmitting the HARQ ACK, multiplexing the HARQ ACK with other uplink control information using a format utilized by a scheduling request when the scheduling request is multiplexed with the other uplink control information.

5. The method of claim 4, wherein the uplink control information comprises at least one selected from the group consisting of channel quality indicator (CQI) feedback, an HARQ ACK/NACK in response to a downlink transmission, an HARQ ACK in response to a downlink semi-persistent scheduling release, and an uplink sounding reference signal.

6. A method of wireless communication, comprising:
receiving an uplink semi-persistent scheduling release;
determining that a hybrid automatic repeat request (HARQ) ACK should be transmitted in a first subframe in response to the received uplink semi-persistent scheduling release;
determining that a scheduling request should be transmitted in a second subframe;
determining whether to transmit the scheduling request and the HARQ-ACK in the first subframe based on whether there is a collision between the scheduling request and the HARQ-ACK, the collision occurring at least when the first subframe and the second subframe are the same subframe; and
transmitting at least one of the scheduling request and the HARQ-ACK based on the determination whether to transmit.

7. The method of claim 6, wherein when there is no collision and no physical uplink shared channel (PUSCH) transmission, the method further comprises:
receiving a physical downlink control channel (PDCCH) message; and
determining a resource for the HARQ-ACK based on a physical uplink control channel (PUCCH) resource defined in a first control channel element received in the PDCCH message,
wherein the transmitting comprises transmitting the HARQ-ACK without the scheduling request using the PUCCH resource.

8. The method of claim 6, wherein when there is no collision and no physical uplink shared channel (PUSCH) transmission, the method further comprises:
determining a resource for the HARQ-ACK based on a resource for the scheduling request,
wherein the transmitting comprises transmitting the HARQ-ACK without the scheduling request using the resource for the scheduling request defined through radio resource control (RRC) signaling.

9. The method of claim 6, wherein when there is a physical uplink shared channel (PUSCH) transmission and no collision, the transmitting comprises transmitting the HARQ-ACK with the PUSCH transmission as a media access control (MAC) packet data unit (PDU).

10. The method of claim 6, wherein the collision occurs only when the first subframe and the second subframe are the same subframe.

11. The method of claim 6, further comprising receiving a configuration for transmitting scheduling requests in a plurality of subframes, the plurality of subframes including the second subframe, wherein the collision occurs only when the first subframe is one of the plurality of subframes.

12. The method of claim 6, wherein when there is a collision and no physical uplink shared channel (PUSCH) transmission, the method further comprises dropping the HARQ-ACK transmission and the transmitting comprises transmitting the scheduling request without the HARQ-ACK.

13. The method of claim 6, wherein when there is a collision and no physical uplink shared channel (PUSCH) transmission, the method further comprises dropping the scheduling request transmission and the transmitting comprises transmitting the HARQ-ACK without the scheduling request.

14. The method of claim 6, wherein when there is a collision and no physical uplink shared channel (PUSCH) transmission, the transmitting comprises transmitting both the HARQ-ACK and the scheduling request together on a physical uplink control channel (PUCCH) using a format that carries at least one more bit than a format used when sending the scheduling request without the HARQ-ACK.

15. The method of claim 6, wherein when there is a collision and a physical uplink shared channel (PUSCH) transmission, the method further comprises dropping the HARQ-ACK transmission and the transmitting comprises transmitting the scheduling request with the PUSCH transmission and without the HARQ-ACK as a media access control (MAC) packet data unit (PDU).

16. The method of claim 6, wherein when there is a collision and a physical uplink shared channel (PUSCH) transmission, the method further comprises dropping the scheduling request transmission and the transmitting comprises transmitting the HARQ-ACK with the PUSCH transmission and without the scheduling request as a media access control (MAC) packet data unit (PDU).

17. The method of claim 6, wherein when there is a collision and a physical uplink shared channel (PUSCH) transmission, the transmitting comprises transmitting both the HARQ-ACK and the scheduling request with the PUSCH transmission as a media access control (MAC) packet data unit (PDU).

18. An apparatus for wireless communication, comprising:
means for receiving an uplink semi-persistent scheduling release;
means for determining whether to transmit a hybrid automatic repeat request (HARQ) ACK in response to the received uplink semi-persistent scheduling release;
means for determining a physical uplink control channel (PUCCH) resource for the HARQ ACK when the HARQ ACK is determined to be transmitted without a physical uplink shared channel (PUSCH) transmission; and
means for transmitting the HARQ ACK using the determined PUCCH resource.

19. The apparatus of claim 18, further comprising means for receiving a physical downlink control channel (PDCCH) message, wherein the PUCCH resource is defined in a first control channel element received in the PDCCH message.

20. The apparatus of claim 18, wherein the PUCCH resource is a resource for a scheduling request defined through radio resource control (RRC) signaling.

21. The apparatus of claim 18, further comprising means for multiplexing the HARQ ACK with other uplink control information using a format utilized by a scheduling request when the scheduling request is multiplexed with the other uplink control information.

22. The apparatus of claim 21, wherein the uplink control information comprises at least one selected from the group consisting of channel quality indicator (CQI) feedback, an HARQ ACK/NACK in response to a downlink transmission, an HARQ ACK in response to a downlink semi-persistent scheduling release, and an uplink sounding reference signal.

23. An apparatus for wireless communication, comprising:
means for receiving an uplink semi-persistent scheduling release;
means for determining that a hybrid automatic repeat request (HARQ) ACK should be transmitted in a first subframe in response to the received uplink semi-persistent scheduling release;
means for determining that a scheduling request should be transmitted in a second subframe;

means for determining whether to transmit the scheduling request and the HARQ-ACK in the first subframe based on whether there is a collision between the scheduling request and the HARQ-ACK, the collision occurring at least when the first subframe and the second subframe are the same subframe; and means for transmitting at least one of the scheduling request and the HARQ-ACK based on the determination whether to transmit.

24. The apparatus of claim 23, wherein when there is no collision and no physical uplink shared channel (PUSCH) transmission, the apparatus further comprises:

means for receiving a physical downlink control channel (PDCCH) message; and means for determining a resource for the HARQ-ACK based on a physical uplink control channel (PUCCH) resource defined in a first control channel element received in the PDCCH message, wherein the means for transmitting transmits the HARQ-ACK without the scheduling request using the PUCCH resource.

25. The apparatus of claim 23, wherein when there is no collision and no physical uplink shared channel (PUSCH) transmission, the apparatus further comprises:

means for determining a resource for the HARQ-ACK based on a resource for the scheduling request, wherein the means for transmitting transmits the HARQ-ACK without the scheduling request using the resource for the scheduling request defined through radio resource control (RRC) signaling.

26. The apparatus of claim 23, wherein when there is a physical uplink shared channel (PUSCH) transmission and no collision, the means for transmitting transmits the HARQ-ACK with the PUSCH transmission as a media access control (MAC) packet data unit (PDU).

27. The apparatus of claim 23, wherein the collision occurs only when the first subframe and the second subframe are the same subframe.

28. The apparatus of claim 23, further comprising means for receiving a configuration for transmitting scheduling requests in a plurality of subframes, the plurality of subframes including the second subframe, wherein the collision occurs only when the first subframe is one of the plurality of subframes.

29. The apparatus of claim 23, wherein when there is a collision and no physical uplink shared channel (PUSCH) transmission, the apparatus further comprises means for dropping the HARQ-ACK transmission, wherein the means for transmitting transmits the scheduling request without the HARQ-ACK.

30. The apparatus of claim 23, wherein when there is a collision and no physical uplink shared channel (PUSCH) transmission, the apparatus further comprises means for dropping the scheduling request transmission, wherein the means for transmitting transmits the HARQ-ACK without the scheduling request.

31. The apparatus of claim 23, wherein when there is a collision and no physical uplink shared channel (PUSCH) transmission, the means for transmitting transmits both the HARQ-ACK and the scheduling request together on a physical uplink control channel (PUCCH) using a format that carries at least one more bit than a format used when sending the scheduling request without the HARQ-ACK.

32. The apparatus of claim 23, wherein when there is a collision and a physical uplink shared channel (PUSCH) transmission, the apparatus further comprises means for dropping the HARQ-ACK transmission, wherein the means for transmitting transmits the scheduling request with the PUSCH transmission and without the HARQ-ACK as a media access control (MAC) packet data unit (PDU).

33. The apparatus of claim 23, wherein when there is a collision and a physical uplink shared channel (PUSCH) transmission, the apparatus further comprises means for dropping the scheduling request transmission, wherein the means for transmitting transmits the HARQ-ACK with the PUSCH transmission and without the scheduling request as a media access control (MAC) packet data unit (PDU).

34. The apparatus of claim 23, wherein when there is a collision and a physical uplink shared channel (PUSCH) transmission, the means for transmitting transmits both the HARQ-ACK and the scheduling request with the PUSCH transmission as a media access control (MAC) packet data unit (PDU).

35. A computer program product, comprising:

a computer-readable medium comprising code for:

receiving an uplink semi-persistent scheduling release;

determining whether to transmit a hybrid automatic repeat request (HARQ) ACK in response to the received uplink semi-persistent scheduling release;

determining a physical uplink control channel (PUCCH) resource for the HARQ ACK when the HARQ ACK is determined to be transmitted without a physical uplink shared channel (PUSCH) transmission; and transmitting the HARQ ACK using the determined PUCCH resource.

36. The computer program product of claim 35, wherein the computer-readable medium further comprises code for receiving a physical downlink control channel (PDCCH) message, wherein the PUCCH resource is defined in a first control channel element received in the PDCCH message.

37. The computer program product of claim 35, wherein the PUCCH resource is a resource for a scheduling request defined through radio resource control (RRC) signaling.

38. The computer program product of claim 35, wherein the computer-readable medium further comprises code for multiplexing the HARQ ACK with other uplink control information using a format utilized by a scheduling request when the scheduling request is multiplexed with the other uplink control information.

39. The computer program product of claim 38, wherein the uplink control information comprises at least one selected from the group consisting of channel quality indicator (CQI) feedback, an HARQ ACK/NACK in response to a downlink transmission, an HARQ ACK in response to a downlink semi-persistent scheduling release, and an uplink sounding reference signal.

40. A computer program product, comprising:

a computer-readable medium comprising code for:

receiving an uplink semi-persistent scheduling release;

determining that a hybrid automatic repeat request (HARQ) ACK should be transmitted in a first subframe in response to the received uplink semi-persistent scheduling release;

determining that a scheduling request should be transmitted in a second subframe;

determining whether to transmit the scheduling request and the HARQ-ACK in the first subframe based on whether there is a collision between the scheduling request and the HARQ-ACK, the collision occurring at least when the first subframe and the second subframe are the same subframe; and transmitting at least one of the scheduling request and the HARQ-ACK based on the determination whether to transmit.

41. An apparatus for wireless communication, comprising:
a processing system configured to:
   receive an uplink semi-persistent scheduling release;
   determine whether to transmit a hybrid automatic repeat request (HARQ) ACK in response to the received uplink semi-persistent scheduling release;
   determine a physical uplink control channel (PUCCH) resource for the HARQ ACK when the HARQ ACK is determined to be transmitted without a physical uplink shared channel (PUSCH) transmission; and
   transmit the HARQ ACK using the determined PUCCH resource.

42. The apparatus of claim 41, wherein the processing system is further configured to receive a physical downlink control channel (PDCCH) message, wherein the PUCCH resource is defined in a first control channel element received in the PDCCH message.

43. The apparatus of claim 41, wherein the PUCCH resource is a resource for a scheduling request defined through radio resource control (RRC) signaling.

44. The apparatus of claim 41, wherein the processing system is further configured to multiplex the HARQ ACK with other uplink control information using a format utilized by a scheduling request when the scheduling request is multiplexed with the other uplink control information.

45. The apparatus of claim 44, wherein the uplink control information comprises at least one selected from the group consisting of channel quality indicator (CQI) feedback, an HARQ ACK/NACK in response to a downlink transmission, an HARQ ACK in response to a downlink semi-persistent scheduling release, and an uplink sounding reference signal.

46. An apparatus for wireless communication, comprising:
a processing system configured to:
   receive an uplink semi-persistent scheduling release;
   determine that a hybrid automatic repeat request (HARQ) ACK should be transmitted in a first subframe in response to the received uplink semi-persistent scheduling release;
   determine that a scheduling request should be transmitted in a second subframe;
   determine whether to transmit the scheduling request and the HARQ-ACK in the first subframe based on whether there is a collision between the scheduling request and the HARQ-ACK, the collision occurring at least when the first subframe and the second subframe are the same subframe; and
   transmit at least one of the scheduling request and the HARQ-ACK based on the determination whether to transmit.

* * * * *